Aug. 18, 1931.  E. D. EBY  1,819,882
INSULATED CABLE JOINT
Filed Aug. 18, 1927
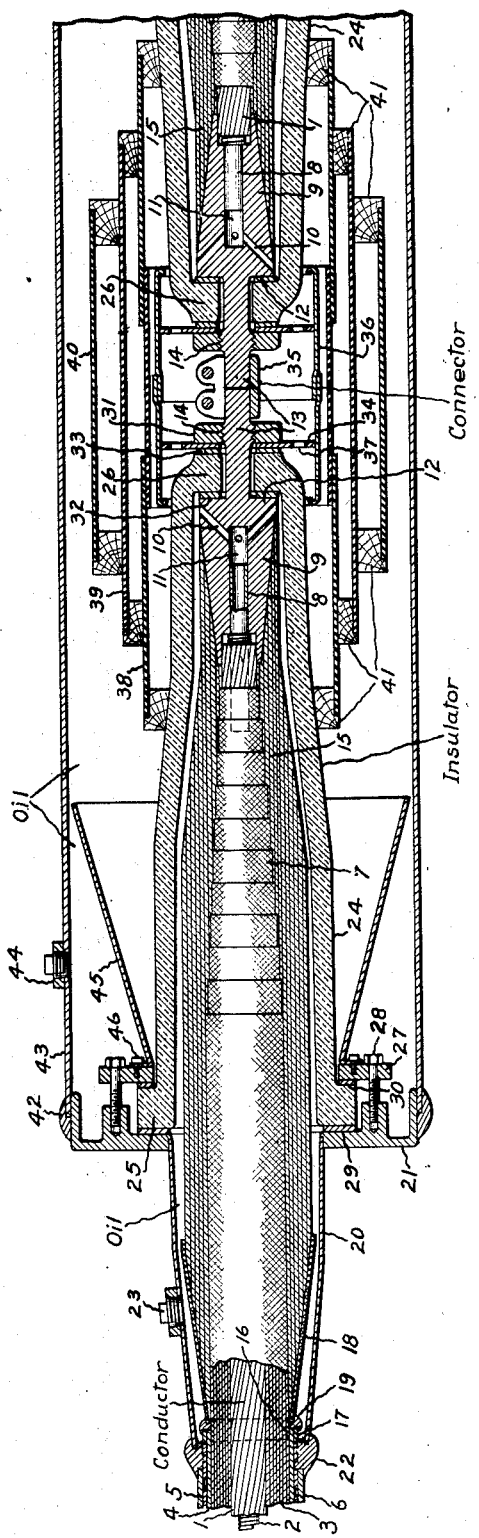

Patented Aug. 18, 1931

1,819,882

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

INSULATED CABLE JOINT

Application filed August 18, 1927. Serial No. 213,914.

The present invention relates to electric power transmission and more especially to lead sheathed cables for installation under ground.

In order effectively to insulate underground cables for transmission of power at very high potentials, it is customary to arrange the metal conductor strands or wires in the form of a hollow tube and surround such conductor tube with a series of wrappings of closely wound paper tapes and encase the whole in a lead pipe sheath. The hollow of the conductor is filled with liquid insulation, such as oil, which permeates the paper wrappings and fills up any voids or spaces within the lead pipe sheath and thereby materially aids in resisting the escape of electric current from the metal conductor to ground. Such oil-filled cables are made in sections of a few hundred feet and, upon being installed in ground conduits, are joined end to end at properly located manholes.

The object of my invention is the provision of an improved joint for connecting lengths of oil-filled cables whereby flow of the liquid from one length or section to another shall be positively prevented and any length of cable between two such points shall be in effect an independent liquid container, whereby the installation and upkeep of the cable shall be made easy of accomplishment, and whereby the necessary high resistivity to the escape of electric current shall be maintained through the liquid stop joint.

One embodiment of my invention is illustrated in the accompanying drawing which is a longitudinal section of somewhat more than one-half length of a complete joint. The right-hand portion is a counterpart of the complete left-hand portion and is shown broken away to permit of illustration on a large scale.

As shown in the drawing, the metallic conductor consists of wires or strands 1 laid up about a wire helix 2 which provides a central passageway for liquid insulation and about the strands 1 is solid insulation 3 consisting of closely wound paper tape and over the outer surface of the solid insulation 3 is a lead sheath 4 reinforced to withstand hydrostatic pressure within by a helical winding of bronze or steel tape 5 and a second lead sheath 6 enclosing and protecting the reinforcement tape 5.

When two lengths of such insulated cable are to be joined, the two lead sheaths 4 and 6 and the reinforcing tape 5 are removed for the necessary distance back from each end of the metallic conductor 1 and the solid paper wrappings 3 removed so as to form stepped cones 7 thereof with a short section of bare conductor exposed at each end.

Into the hollow of each conductor end a short length of copper tube 8 is inserted and a metallic terminal cap 9 is soldered to the outer end of the copper tube 8 and to the end of electric conductor. Each terminal cap 9 has an enlarged central section of a diameter determined by the allowable radial stress in the surrounding oil which tapers toward the end to which the conductor is attached and has diagonal oil holes 10 extending from the periphery to an axial bore 11 into the end of which the stranded conductor and copper tube 8 extend, and at the opposite end of the enlarged central section is a radial shoulder 12 and an axial cylindrical connection stud 13 with an intermediate portion of its length provided with a screw thread 14.

After a terminal cap 9 has been soldered to a conductor end, treated insulating tape 15, such as varnished cambric, is carefully wound between the stepped conical surface 7 of the paper insulation 3 and the adjacent tapered surface of the terminal cap 9 until the cylindrical wall of the solid insulation 3 is, in effect, restored to a point just short of the oil holes 10 in the terminal cap; thereafter the treated tape 15 is wound upon the surface of the original and restored solid insulation from a point adjacent the end of the lead sheath 4 to a point substantially in the plane of the tapered end of the terminal cap 9 with its opposite ends receding or tapered until an outside diameter is reached which will result in a safe radial gradient in the surrounding oil at the end of braid 18.

A thin copper band 16 is inserted for about half its length between the end of the inner lead sheath 4 and the solid insulation 3. A narrow copper braid 18 is soldered over the projecting end of the thin band 16 and to the end of the cable sheath 4 at 19 and wound in butted convolutions over the adjacent receding or conical end of the treated tape wrapping 15. The several convolutions of copper braid are secured together by solder, the purpose of the copper braid wrapping 18 being to serve as an electrostatic shield which in effect extends the ends of the lead sheaths 4 and 6, which normally are at ground potential, to a point having maximum solid insulation between them and the high potential metallic conductor 1. A lead ring 17 is placed around the end of the cable sheath 4 to assist in centering the metal sleeve 20.

A tapered sheet metal sleeve 20, which is usually passed over the cable end before stripping of the lead therefrom has brazed or welded to its larger end a cast brass end ring 21, while its smaller end is of a size to fit closely the outside of the lead sheath 6 so that when drawn forward to near the ends of the sheaths 4 and 6 a wiped solder joint 22 serves to unite hermetically their ends and the sheet metal sleeve 20. The sleeve is provided with a plug nozzle 23 to permit liquid insulation to be supplied to or extracted from the interior of the sleeve.

In order effectually to seal up insulatively the end of the insulated conductor against any possible escape of oil and to provide for its flow from the nozzle 23 to and through the holes 10 in the terminal cap 9 and into the hollow of the metallic conductor 1, an elongated tapered shell 24 of insulating material, such as porcelain, is provided. It is shaped internally to provide clearance or oil space between it and the outside of the wrapped insulating tape 15. It has at its larger end an external flange 25 and at its smaller end an internal flange 26. The external flange 25 is rigidly fastened to the end ring 21 by a clamping ring 27 and bolts 28 with interposed gaskets 29 and 30 of cork or other suitable yielding material. The internal flange 26 is fastened to the terminal cap 9 by a nut 31 engaging the thread 14 on the stud 13 with gaskets 32 and 33 interposed respectively between opposite sides of the flange and the terminal shoulder 12 and the nut. For a purpose to be stated later a metal disk 34 is assembled between the nut 31 and gasket 33.

The terminals of two lengths of cable, each prepared and insulatively encased as above described, are joined by bringing their respective terminal studs 13 into aligned juxtaposition and a split clamping sleeve or connector 35 applied thereto.

An electrostatic shield 36 consisting of two short length metal cylinders of a diameter to just clear the small ends of the insulating shells 24 and with their meeting ends adapted to telescope, which prior to making connection of the cable ends were slipped back over the respective insulating shells 24, are brought into position and electrically connected together and to the peripheries of the respective metal disks 34. The disks 34 are provided with perforations 37 to permit the insulating liquid to circulate freely therethrough.

Outside the electrostatic shield 36 are a series of insulating cylinders 38, 39 and 40 of progressively increasing diameters and held in spaced relation to each other and concentric to the metallic conductor 1 by interposed wooden blocks 41. The inner cylinder 38 is made in sections to facilitate assembly.

The peripheries of the end rings 21 are connected by wiped joints 42 to the ends of a metal cylinder 43 which thus constitute a container for insulating liquid which may be supplied to and extracted from it through a plug nozzle 44 in the upper wall of the cylinder.

In order to distribute the electrostatic stress at ground potential at the ends of the oil container 43, a frusto-conical shield 45 of sheet metal is connected at its smaller end to each of the clamping rings 27 adjacent the inner portion thereof by suitable set screws 46, while the larger end of the shield extends outwardly and adjacent to the cylinder 43.

The region of electric static stress, between the cylindrical electrostatic shield 36 and the central portion of the encasement cylinder 43, is filled with insulating liquid (not shown) and the spaced insulating cylinders 38, 39 and 40 and any tendency of the current to creep along the outer surface of the long insulating shell 24 is overcome by the shunting effect of the ground shield 45.

The ground shield 45 serves, together with the copper braid shield 18 and the larger portion of the tapered shell sleeve 20, to form an approximately continuous, smooth metal surface extending from the lead sheath of the cable to the outer casing cylinder 43. With the surfaces of these parts thus shaped the potential differences, along the surfaces of discontinuity between the solid insulation 3 of the cable, the treated tape wrapping 15, the oil space or channel adjacent thereto, the insulating shell 24 and the oil space outside the insulating shell 24, are approximately uniform and provide for gradients, both radial and lateral, which are within the safe working values of the several materials specified.

On account of the oil space within the container cylinder 43 being wholly cut off from the oil spaces within and about the ends of the respective sheathed cables, leakage or designed evacuation of oil from any one of the spaces may take place without affecting that in any of the other spaces. Also the fluid pressures in the respective spaces may be maintained at any degree desired irrespective of that in the others.

Where it is desired to maintain a constant supply of insulating liquid to the sheathed cable sections or the joints between them, to make up for any loss by leakage or differences in expansion of parts, oil tanks or reservoirs (not shown) are connected to nozzles 23 and 44 in well known manner.

It will be noted that by reason of the tapering insulating shells 24 firmly bolted at their larger ends to the end rings 21 of the main oil container, they effectually serve as posts for holding the cable ends and the insulating cylinders 38, 39 and 40 fixedly centered with relation to the container cylinder 43. Also in case it should become necessary to disconnect the two ends of the cable, such as for electrically testing any part of the circuit, the insulated joint may be readily disassembled by withdrawing the insulating liquid therefrom, unsoldering the cylinder 43 at 42 and sliding endwise the insulating cylinders and cylindrical shield 36.

While I have shown and described the best embodiment of the invention known to me, I do not desire to be restricted thereto.

What I claim as new and desire to secure by Letters Patent of the United States is:

1. In an insulating joint, the combination of sheathed oil-filled cables, an oil stop comprising a tapered insulating shell adapted to enclose with clearance a sheath stripped cable end, a terminal cap having oil passages and connected to the conductor of said cable and extending through an end of said insulating shell, and means for connecting by oil-tight joints the respective ends of said tapered insulating shell to said terminal stud and to the sheath of said cable.

2. In an insulating joint, the combination of sheathed oil-filled cables, an oil stop comprising a tapered insulating shell adapted to enclose with clearance a sheath stripped cable end, a terminal cap having oil passages therethrough connected to the conductor of said cable and provided with a stud extending through an end of said insulating shell, means for connecting the respective ends of said tapered insulating shell by oil-tight joints with said terminal and the sheath of said cable, and provisions to introduce oil into said insulating shell.

3. In an insulating joint, the combination of sheathed oil-filled cables, metallic tubes in the hollow ends of said cable conductors, an oil stop comprising an elongated insulating shell adapted to enclose a sheath stripped cable end and having an external flange at one end and an internal flange at the other end, a shouldered and threaded terminal stud connected to the cable conductor and tube therein and extending through the internally flanged end of said insulating shell, said stud being provided with oil holes communicating with the ends of said tubes, gaskets disposed on opposite sides of said internal flange, a nut engaging said threaded terminal stud, and means for connecting the external flange of said insulating shell by oil-tight joint to the sheath of said cable.

4. In an insulating joint, the combination of sheathed oil-filled cables, a metallic tube in the hollow end of each cable conductor, an oil stop comprising an elongated insulating shell adopted to enclose a sheath stripped cable end and having at one end an external flange, a terminal stud provided with oil holes connected to the cable conductor and tube and extending through the end of said insulating shell opposite said external flange, a sheet metal sleeve permanently attached at one end to the end of the cable sheath and at the other to a metal end ring, a clamping ring for connecting the external flange of said insulating shell to said end ring with interposed gaskets, and means for connecting the opposite end of said insulating shell by oil-tight joint to said terminal stud.

5. In an insulating joint for sheathed oil-filled cables, the combination of insulated sleeved oil stops respectively adapted to enclose and oil seal the sheath stripped ends of two cables to be joined, terminal studs connected to the conductors of said cables and extending through the ends of the respective oil stops, metal disks connected radially to said terminal studs, and an electrostatic shield surrounding and electrically connected to said metal disks.

6. In an insulating joint for sheathed oil-filled cables, the combination of insulated oil stops respectively adapted to oil seal the ends of two cables to be joined, terminal studs connected to the conductors of said cables and extending outside said oil stops, means for connecting said studs together in alignment, an electrostatic shield connected to said terminal studs, an oil container surrounding said insulated oil stops and said electrostatic shield and connected at its ends to the sheaths of the respective cables, and frustro-conical ground shield connected at their smaller ends to the ends of said container adjacent the outer ends of the oil stops.

7. In an insulating joint for sheathed oil-filled cables, the combination of a rigid oil container having its end walls respectively apertured for entrance therein of two sheath' stripped cable ends, means for connecting said container ends respectively to the ends of the cable sheaths, tapered insulating shells bolted at their larger ends to the inner surfaces of said end walls, terminal studs connected respectively to the cable conductor ends and extending through the smaller ends of said insulating shells, means for connecting said terminal studs together in alignment, an electrostatic shield connected to and surrounding said terminal studs and spaced insulating cylinders supported on said tapered insulating shells concentrically to said electrostatic shield.

8. An end stud for oil-filled cables having an enlarged head at one end and a threaded shank at the other, said head having a stepped axial bore in the end opposite the threaded shank and oil holes extending from the inner end of said bore through the side walls of said head.

9. An end stud for oil-filled cables having an enlarged head portion and a shank portion, said head portion being tapered toward the outer end and the rear end provided with a radial shoulder, an axial bore extending from the outer end, and diagonal holes extending from the inner end of said bore through the walls of said head toward the inner end thereof.

10. In an insulating joint, the combination with two sections of oil filled sheathed cable, of means for connecting the conductors thereof together, an oil container disposed about the said connecting means comprising a metal cylinder and two metal rings connected to the ends thereof and to the sheaths of the respective cable sections, and conical ground shields disposed within said oil container and connected at their smaller ends to the respective metal rings.

11. In an insulating joint, the combination of two sections of sheathed, fluid filled cables provided with connectors, the insulation adjacent the ends of said cable sections being removed to form cones, two tapered insulating shells respectively enclosing with clearance the insulation of said cable ends, a series of concentric barriers of insulating material arranged in spaced relation to the connectors and to each other, the ends of the inner barrier overlying the opposed ends of the shells, and means for connecting by fluid-tight joints the respective ends of each shell to the connector and the sheath of a cable section.

12. In an insulating joint, the combination of two sections of sheathed cables having axial fluid passages and provided with connectors, the insulation adjacent the ends of said cable sections being tapered toward each other, two tapered insulating shells forming oil stops arranged with clearance about the insulation of the respective cable ends, means for connecting by fluid-tight joints the respective ends of each shell to the connector and the sheath of a cable section, and each of said connectors being provided with passages for respectively connecting the axial fluid passage of a cable section with the clearance inside its insulating shell.

13. In an insulating joint, the combination of two cable sections having axial fluid passages and provided with connectors, the insulation adjacent the ends of said cable sections being tapered toward each other, reenforcement insulation disposed about a portion of the unremoved cable insulation, the tapered portion thereof and a part of the connector of the respective cable sections, tapered insulating shells enclosing with clearance the respective reenforcement insulations, means for connecting the respective ends of each insulating shell with fluid-tight joints to the connector and the sheath of a cable section, said connectors having passages for respectively connecting the axial passage of a cable section to the clearance inside an insulating shell, and a fluid containing casing enclosing said insulating shells.

14. In an insulating joint, the combination of two fluid filled cable sections provided with connectors, the insulation adjacent the ends of said cable sections being tapered toward each other, tapered insulating shells enclosing with clearance the insulation of the respective cable ends and each secured at its ends by fluid-tight joints to the connector and the cable sheath, a metal casing secured to the sheaths of both cable sections, and a metal cylinder within said casing connected to the cable connector and overlying the adjacent ends of said insulating shells.

15. In an insulating joint, the combination of two sections of sheathed, fluid filled cables, the insulation adjacent the ends of said cable sections being removed to form cones, means for electrically connecting the cable ends, two tapered insulating shells respectively enclosing with clearance the insulation of said cable ends, means for connecting by fluid-tight joints the respective ends of each shell to the connector and the sheath of a cable section, and cylinders of insulating material arranged in concentric spaced relation which surround the connecting means and also the smaller adjacent ends of the tapered insulating shells.

16. In an insulating joint, the combination of two sections of sheathed, fluid filled cables, the insulation adjacent the ends of said cable sections being removed to form cones, a connecting means for the cable sections, bodies of tape applied over the cones, shells of insulation which are secured fluid tight to the connecting means, each of said shells surrounding with clearance a body of tape, an enclosing metal casing for the joint which is secured at its ends to the sheaths of the cable sections, electrostatic shields situated between the outer ends of the bodies of tape and the adjacent wall of the metal casing, and other electrostatic shields which surround the shells at one end and gradually diverge to a region where they are in close proximity to the inner wall of the casing.

17. In an insulating joint, the combination of two sections of sheathed, fluid filled cables, from the adjacent ends of which the insulation has been removed to form cones, a connecting means for the cable sections, bodies of tape applied over the cones, shells of insulation which are secured fluid tight to the connecting means, each of which surrounds with clearance a body of tape, an enclosing metal casing for the joint which is secured at its ends to the sheaths of the cable sections, electrostatic shields situated between the outer ends of the bodies of tape and the adjacent wall of the metal casing, other electrostatic shields which surround the shells at one end and gradually diverge to a region where they are in close proximity to the inner wall of the casing, and cylinders of insulating material which are arranged in spaced concentric relation with respect to the cable ends and occupy the space between the last mentioned electrostatic shields.

18. In an insulating joint, the combination of a pair of fluid filled cables arranged end to end, a connector for electrically uniting them, a pair of oppositely disposed cone shaped insulators each of which encloses a cable end, a means for sealing the small end of each cone to the connector to prevent the escape of fluid from a cable, a metal enclosing casing comprising end portions which are sealed to the cable sheaths, annular members which are united to said end portions and form fluid tight seals for the outer ends of the cone shaped insulators, and a tubular element which surrounds the central portion of the joint and is supported at its ends by the annular members, and cone shaped electrostatic shields between the insulators and the enclosing casing, each of said shields diverging from the large end of an insulator toward its small end and in spaced relation thereto, whereby the potential differences in these regions are of approximately uniform gradation.

In witness whereof I have hereunto set my hand this eleventh day of August, 1927.

EUGENE D. EBY.